(12) United States Patent
Lee et al.

(10) Patent No.: US 11,472,344 B2
(45) Date of Patent: Oct. 18, 2022

(54) ELECTROCHROMIC MIRROR MODULE

(71) Applicant: Unimicron Technology Corp., Taoyuan (TW)

(72) Inventors: An-Sheng Lee, Hsin-chu County (TW); Meng-Chia Chan, Hsin-chu County (TW); Ming-Yuan Hsu, Hsin-chu County (TW); Sheng-Hsien Lin, Hsin-chu County (TW)

(73) Assignee: Unimicron Technology Corp., Taoyuan (TW)

( * ) Notice: Subject to any disclaimer, the term of this patent is extended or adjusted under 35 U.S.C. 154(b) by 279 days.

(21) Appl. No.: 16/721,953

(22) Filed: Dec. 20, 2019

(65) Prior Publication Data

US 2021/0114522 A1 Apr. 22, 2021

(30) Foreign Application Priority Data

Oct. 21, 2019 (TW) ................. 108137936

(51) Int. Cl.
*G02F 1/153* (2006.01)
*B60R 1/08* (2006.01)
*G02F 1/155* (2006.01)
*G02F 1/1516* (2019.01)

(52) U.S. Cl.
CPC .............. *B60R 1/088* (2013.01); *G02F 1/155* (2013.01); *G02F 1/15165* (2019.01)

(58) Field of Classification Search
CPC ..... B60R 1/088; G02F 1/15165; G02F 1/155; G02F 1/153; G02F 1/157; G02F 2202/28

USPC .................................................. 359/265–274
See application file for complete search history.

(56) References Cited

U.S. PATENT DOCUMENTS 5,115,346 A 5/1992 Lynam
5,680,245 A 10/1997 Lynam

FOREIGN PATENT DOCUMENTS

| CN | 208270900 U | 12/2018 | |
| CN | 109822996 A | 5/2019 | |
| EP | 0705734 A1 * | 4/1996 | ............. B60R 1/088 |
| TW | I234582 B | 6/2005 | |
| TW | 201927919 A | 7/2019 | |
| WO | WO-2013036789 A1 * | 3/2013 | ............... C09K 9/02 |

\* cited by examiner

*Primary Examiner* — Mahidere S Sahle
(74) *Attorney, Agent, or Firm* — CKC & Partners Co., LLC

(57) ABSTRACT

An electrochromic mirror module including a cover lens, a connecting layer, and an electrochromic device is provided. The connecting layer includes a first absorbing material. The connecting layer connects between the cover lens and the electrochromic device. The electrochromic mirror module is configured to receive an incident light, and the incident light sequentially transmits through the cover plate and the connection layer to reach the electrochromic device. The first absorbing material is configured to absorb light of the incident light, whose wavelength falls in a first spectrum, and the wavelength of the first spectrum fall within the range of 570 nm to 720 nm.

7 Claims, 2 Drawing Sheets

ELECTROCHROMIC MIRROR MODULE

CROSS-REFERENCE TO RELATED APPLICATION

This application claims priority to Taiwan Application Serial Number 108137936, filed Oct. 21, 2019, which is herein incorporated by reference in its entirety.

BACKGROUND

Field of Disclosure

The present disclosure relates to an optical apparatus. More particularly, the present disclosure relates to an electrochromic mirror module.

Description of Related Art

In vehicles using nowadays, rear-view mirrors made by electrochromic materials have been installed in some of the vehicles. Among the existing electrochromic rear-view mirror apparatus, the electrochromic material provides a brighter reflecting image for observing vehicles behind during the day, and increases the light absorption rate to provide anti-glare function during the night, so as to avoid the driving vision being affected by the lights of vehicles behind. However, based on the characteristics of the material used in the existing electrochromic rear-view mirrors, the appearance color of the electrochromic mirrors may be yellowish, and the yellowish color may become deeper with time. Therefore, how to provide an electrochromic rear-view mirror with an appropriate appearance is one of the problems that need to be solved for person having ordinary skill in the art.

SUMMARY

An embodiment of the present disclosure provides an electrochromic mirror module, and the electrochromic mirror module includes a cover lens, a connecting layer, and an electrochromic device. The connecting layer has a first absorbing material, and the connecting layer connects the cover lens to the electrochromic device. The electrochromic device is configured to receive an incident light, and the incident light sequentially passes through the cover lens and the connecting layer and reaches the electrochromic device. The first absorbing material is configured to absorb a light of the incident light which is in a first spectrum, and wavelength of the first spectrum falls in a range from 570 nm to 720 nm.

In an embodiment of the present disclosure, the first absorbing material includes a polymer, and the polymer includes a 1,3-diphenylisobenzofuran, a carotenoid, a polybenzene, or a derivative thereof.

In an embodiment of the present disclosure, the connecting layer includes an adhesive.

In an embodiment of the present disclosure, the connecting layer includes a second absorbing material being configured to absorb a light of the incident light which is in a second spectrum, and wavelength of the second spectrum falls in a range from 300 nm to 400 nm.

In an embodiment of the present disclosure, the second absorbing material includes a methyl salicylate material, a benzophenone material, a benzotriazole material, a substituted acrylonitrile, and a s-triazine compound material.

In an embodiment of the present disclosure, the electrochromic device includes a first light transmissive electrode, an electrochromic layer, and a second light transmissive electrode. The electrochromic layer is disposed between the first light transmissive electrode and the second light transmissive electrode, and the incident light reaches the electrochromic layer through the first light transmissive electrode.

In an embodiment of the present disclosure, the electrochromic device further includes a light transmissive substrate, and a reflective substrate. The first light transmissive electrode is disposed on a surface of the light transmissive substrate facing the electrochromic layer. The reflective substrate is corresponded to the light transmissive substrate, and the second light transmissive electrode is disposed on a surface of the reflective substrate facing the electrochromic layer.

In an embodiment of the present disclosure, the electrochromic layer includes an organic material, and the organic material includes polymer of 3,4-Ethylenedioxythiophene monomer, V1logen monomer, or acrylic monomer.

In an embodiment of the present disclosure, the electrochromic mirror module further includes a carrier substrate. The electrochromic device, the connecting layer and the cover lens are sequentially disposed on the carrier substrate.

As seen above, an embodiment of the present disclosure provides a electrochromic mirror module with a first absorbing material, which can absorb light having wavelength in a range from 570 nm to 720 nm, and, therefore; the electrochromic mirror module can provide a proper color appearance.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
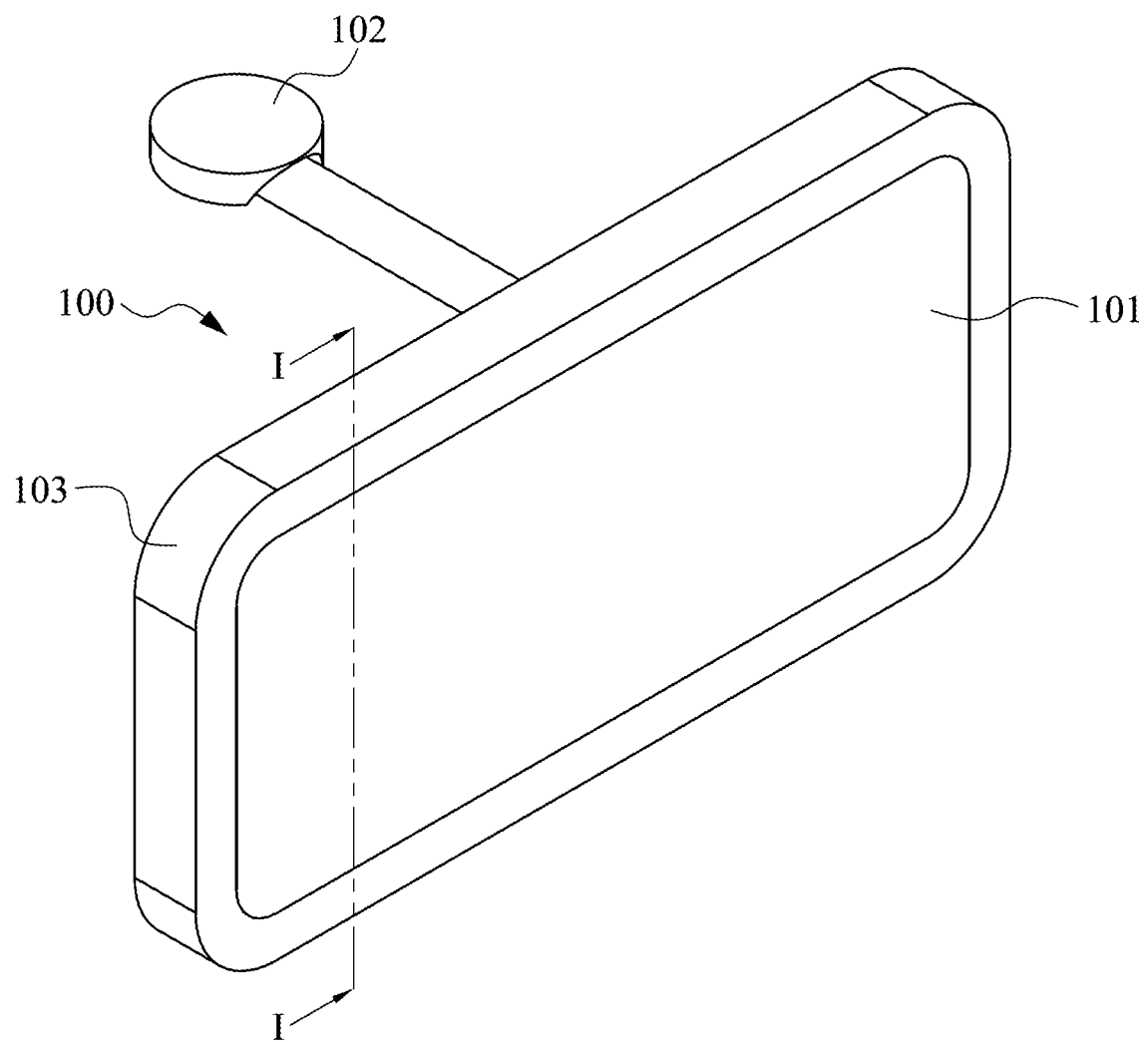
FIG. 1 is a schematic perspective view of an electrochromic mirror module of an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Electrochromic mirror module provided by the embodiment of the present disclosure can be applied to vehicles. For instance, the electrochromic mirror module provided by the embodiment of the present disclosure can be applied to rear-view mirror between driver and passenger seats in vehicle, and can also be applied to rear-view mirrors on motorcycle, electrical bicycle and etc., but the present disclosure is not limited thereto.

It should be understood that, though the technical words "the first", "the second", "the third" and etc. in the text can be used to describe different devices, components, areas, layers and/or parts, but the devices, components, areas, layers and/or parts should not be limited by these technical words. The technical words are used to differentiate one device, component, area, layer and/or part from others. Thus, "the first device", "the component," "the area," "the layer" and/or "the part" can also be called "the second device", "the component," "the area," "the layer" and/or "the part" without departing from the teaching herein.

FIG. 1 is a schematic perspective view of electrochromic mirror module of an embodiment of the present disclosure. Please refer to FIG. 1, electrochromic mirror module 100 of an embodiment of the present disclosure provides a visible surface 101, user can observe rear view through the visible surface 101, and the electrochromic mirror module 100 can be attached in a vehicle. For instance, the electrochromic mirror module 100 of the embodiment can include a connecting end 102, and the electrochromic mirror module 100 can be attached on the windshield of a vehicle via the connecting end 102.

In the embodiment, the connection end 102 can attach to the windshield through adhesive, and the connection end 102 can also attach to an installation trench on the windshield through a knob thereon, but the disclosure is not limited thereon. The connection end 102 can includes, for example, a joint, and the joint can be located on the end connecting the windshield or the end connecting the electrochromic mirror module, and the joint can be ball joint, but the disclosure is not limited thereto. Also, present disclosure is not limit to shape and number of the connection end 102, and the person having ordinary skill can adjust the connection end 102 according to requirement, so as to properly attach the electrochromic mirror module 100 to the windshield of a vehicle.

Furthermore, please refer to FIG. 1, the electrochromic mirror module 100 of the embodiment can include case 103, for example. The case 103 of the example can cover the peripheral of the visible surface 101, but the disclosure is not limited thereto. In other embodiment of the present disclosure, the case 103 can be disposed on the rare of the visible surface 101, so as to provide a frameless visible surface 101 of the electrochromic mirror module 100. Material of the case 103 can include, for example, acrylic with higher stiffness or any other material that is capable for providing support, but the disclosure is not limited thereto. The disclosure is not limit to the shapes, sizes, or the manner of connections of the above connection end 102 and the case 103. Further details of the electrochromic mirror module 100 of the embodiment will be describe in following.

Figure 2:
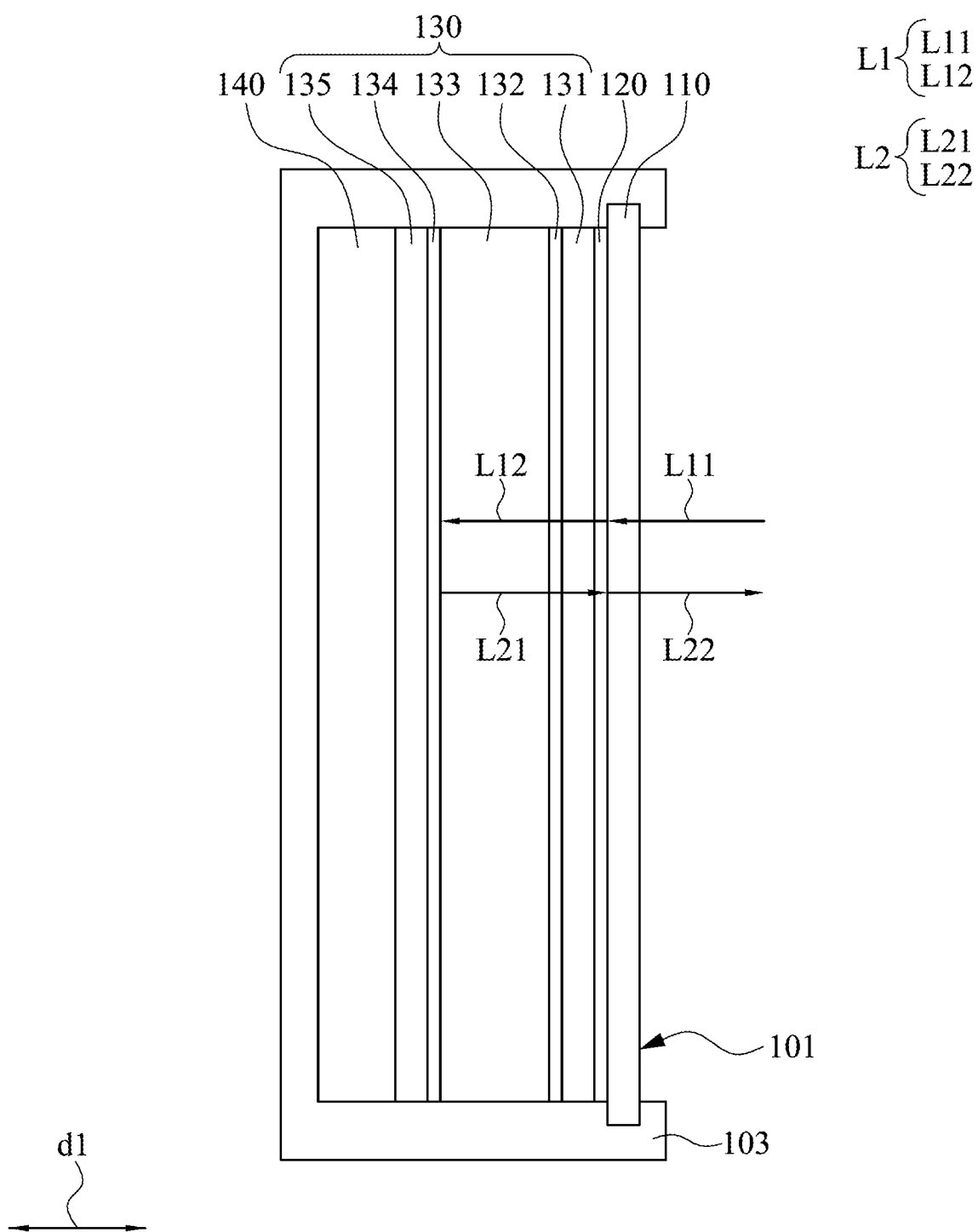
FIG. 2 is a sectional view taken along a cutting plane line I in FIG. 1.

FIG. 2 is a sectional view taken along the cutting plane line I in FIG. 1. In the figures, the thickness of layers, films, panels, regions, etc., are exaggerated for clarity. Throughout the specification, the same reference numerals denote the same component. It will be understood that when a component such as a layer, a film, a region or a substrate is referred to as "on" or "connected to" another component, intermediate components can also be present. In contrast, when a component is referred to as "directly on" or "directly connected to" another component, no intermediate component can be present. As used herein, "connected" may refer to both physical and/or electrical connections. Furthermore, "electrical connection" or "coupled" may be the presence of other components between two elements.

Please refer to FIG. 2, in the embodiment, the electrochromic mirror module 100 includes a cover lens 110, a connecting layer 120, and a electrochromic device 130. The connecting layer 120 has a first absorbing material, and the connecting layer 120 connects the cover lens 110 to the electrochromic device 130.

In the embodiment, the electrochromic mirror module 100 is configured to receive an incident light L1, and the incident light L1 sequentially passes through the cover lens 110, the connecting layer 120, and reaches the electrochromic device 130. The first absorbing material is configured to absorb a light of the incident light L1, which is in a first spectrum, and wavelength of the first spectrum falls in the range from 570 nm to 720 nm.

For instance, in the embodiment, light L11 in the first spectrum enters the electrochromic mirror module 100 and reaches the connecting layer 120 from the visible surface 101. The first absorbing material of the connecting layer 120 absorbs the light of the light L11 in the first spectrum, allowing remaining light L12 be transmitted to electrochromic device 130.

The first absorbing material of the connecting layer 120 of the present disclosure can absorb light in the first spectrum, thus the light L12 reached the electrochromic device 130 is not having, for instance, red visible light spectrum (wavelength falls in a range from 630 nm to 700 nm), orange visible light spectrum (wavelength falls in a range from 600 nm to 630 nm) and yellow visible light spectrum (wavelength falls in a range from 570 nm to 600 nm). Therefore, to the electrochromic device 130 of the embodiment, the incident light has fallen within an appropriate spectrum range.

Furthermore, the electrochromic device 130 of the embodiment will provide a reflected light L2 after receiving the incident light L1. In the reflected light L2 provided by the electrochromic device 130, light L12 emitted from the electrochromic device 130 will reach the connecting layer 120. The connecting layer 120 further absorbs light of light L21 in the first spectrum, allowing remaining light L22 to be emitted from the visible surface 101. The eyes of user can receive the light L22 from the electrochromic mirror module 100, and the ratio of light having a wavelength falling in the first spectrum in the light L22 is lower or even none, thus user will not see yellowish images. Since the electrochromic mirror module 100 of the embodiment can provide light in appropriate wavelength range on the visible surface 101, the image as seen by the user will not be yellowish, so that good visual effects can be provided.

To be specific, in the embodiment, when light L11 is sun light, the b * number of the light L22 in CIELAB color space will fall in the range less than −4 through the absorption of the first absorbing material in the connecting layer 120. In the CIELAB color space, yellower color will have larger and positive b* number, and bluer color will have less and negative b* number. Therefore, the electrochromic mirror module 100 of the embodiment can provide a bluer color, so as to provide a good visual experience. For instance, in an embodiment of the present disclosure, color of the light L22 provided by the electrochromic mirror module 100 can have b* number which falls in a range from −2 to 4, and the user won't see a yellowish image, but the disclosure is not limit thereto.

In other embodiment of the disclosure, the first absorbing material of the connecting layer 120 can only absorb light in red visible spectrum, yellow visible spectrum, or orange visible spectrum, and ingredient, composition ratio of the first absorbing material can be modified according to different requirements, so as to provide a proper light absorption, but the disclosure is not limit thereto.

To be specific, please refer to FIG. 2, in the embodiment, the cover lens 110 can be, for instance, light transmissive glass substrate or acrylic substrate, and the cover lens 110 can also be a light transmissive substrate being able to absorb light in specific spectrum, but the disclosure is not limit thereto.

For instance, please refer to FIG. 2, in the embodiment, the first absorbing material of the connecting layer 120 can be a dye absorbing light having wavelength in the first spectrum, and the first absorbing material may include optical adhesive monomer material and polymer material. 5 to 10% of the polymer material can be mixed with the optical adhesive monomer material. To be specific, after the above materials are proportionally mixed as reaction solution, the polymer material can stand still for 30 minutes and condensates. Following, the solution is slowly mixed for 3 hours in a nitrogen environment from 50 degree to 75 degree Celsius, but the disclosure is not limit thereto.

Furthermore, in the embodiment, the connecting layer 120 can further include an adhesive. In the embodiment, the adhesive is mixed with the first absorbing material, applying between the cover lens 110 and the electrochromic device 130, so as to further provide a bonding.

For instance, in the embodiment, the adhesive can be N-butyl acrylate monomer, acrylic acid monomer, ethyl acetate solvent, AIBN initiator, 1, 3-bis(N, N-diglycidyl-aminomethyl) group, or tetraepoxycyclohexanol crosslinking agent, and the adhesive can properly mixed with the first absorbing material, so as to provide a bonding between the cover lens 110 and the electrochromic device 130.

Furthermore, in the embodiment, the electrochromic device 130 includes a first light transmissive electrode 132, electrochromic layer 133, and a second light transmissive electrode 134. The electrochromic layer 133 is disposed between the first light transmissive electrode 132 and the second light transmissive electrode 134.

Moreover, in the embodiment, the first light transmissive electrode 132 can be disposed adjacent to the visible surface 101, and the second light transmissive electrode 134 can be disposed further from the visible surface 101. The incident light L1 can reach the electrochromic layer 133 through the first light transmissive electrode 132.

In the embodiment, the electrochromic mirror module 100 can provide electric potential on the first light transmissive electrode 132 and the second light transmissive electrode 134, and apply a voltage on the electrochromic layer 133. The electrochromic layer 133 includes electrochromic material, and optical properties of the electrochromic material (such as reflectance, transmittance, absorbance) can be stably and reversibly controlled by the variation of the voltage. Therefore, the first light transmissive electrode 132 and the second light transmissive electrode 134 can control the optical properties of the electrochromic layer 133.

For instance, the first light transmissive electrode 132 and the second light transmissive electrode 134 of the embodiment can include indium tin oxide (ITO), indium zinc oxide (IZO), aluminum tin oxide, aluminum zinc oxide, indium gallium zinc oxide, silver, silver aluminum alloy, and the first light transmissive electrode 132 and the second light transmissive electrode 134 can be a single metal layer or stacked metal layer including the material above, but the disclosure is not limit thereto. For another embodiment, the electrochromic layer 133 of the embodiment is an organic material. The organic material can be, for instance, polymer of 3,4-Ethylenedioxythiophene (PEDOT), or poly(methyl methacrylate) (PMMA) monomer.

Furthermore, in the embodiment, the electrochromic device 130 may further include a light transmissive substrate 131 and a reflective substrate 135, and the reflective substrate 135 is corresponded to the light transmissive substrate 131. A distance between the light transmissive substrate 131 and the visible surface 101 in the embodiment is smaller than a distance between the reflective substrate 135 and the visible surface 101. The first light transmissive electrode 132 is disposed on a surface of the light transmissive substrate 131 facing the electrochromic layer 133, and the second light transmissive electrode 134 is disposed on a surface of the reflective substrate 135 facing the electrochromic layer 133. The incident light L1 can pass through the light transmissive substrate 131 and reach the electrochromic layer 133, and the light pass through the electrochromic layer 133 can be reflected by the reflective substrate 135, and the electrochromic device 130 can provide reflective light L2.

For instance, in the embodiment, the light transmissive substrate 131 can be, for example, a glass substrate, and the reflective substrate 135 can be, for example, a metal substrate or nonmetal substrate. The reflective substrate 135 can also be a glass substrate coated with metal surface, so as to provide a reflective surface, but the disclosure is not limit to the material of the reflective substrate 135.

For another example, when the vehicle is driving in day time, voltage generated by the first light transmissive electrode 132 and the second light transmissive electrode 134 can lower absorbance or rise the transmittance of the electrochromic layer 133, so as to adjust the intensity of the reflective light L2, and the user can clearly see rearward through the electrochromic mirror module 100. When the vehicle is driving in dark environment, voltage generated by the first light transmissive electrode 132 and the second light transmissive electrode 134 can rise absorbance or lower the transmittance of the electrochromic layer 133, so as to lower the intensity of the reflective light L2, and annoying, discomfort, or blindness of the user that might cause by glare of light provide from the head light of vehicles in the back may be avoided.

Moreover, please refer to FIG. 2, in the embodiment, the electrochromic mirror module 100 can further include a carrier substrate 140, and the electrochromic device 130, the connecting layer 120, and the cover lens 110 can be disposed on the carrier substrate 140 in series. To be specific, in the direction d1, the electrochromic device 130 of the embodiment can be disposed between the connecting layer 120 and the carrier substrate 140, and the connecting layer 120 is disposed between the electrochromic device 130 and the cover lens 110.

To be specific, the carrier substrate 140 of the present disclosure may be a glass substrate or a metal substrate, and a proper support can provide, but the disclosure is not limit thereto.

In other embodiment of the disclosure, the connecting layer 120 of the electrochromic mirror module 100 can further include a second absorbing material in addition to the first absorbing material. The second absorbing material is configured to absorb light in a second spectrum of the incident light L1, and wavelength of the second spectrum falls in a range from 300 nm to 400 nm.

Since the second spectrum falls in the range of the UV light spectrum, the second absorbing material can avoid the electrochromic device 130 from receiving exceeded UV light, so as to avoid the electrochromic from degrading. Therefore, the yellow light, orange light and red light of the incident light L1 can be filtered through the connecting layer 120. In addition, the UV light in the incident light L1 can also be filtered, so as to protect material of the electrochromic layer 133 of the electrochromic device 130.

For instance, in the embodiment, the second absorbing material can include, for example, a salicylate type material, a benzophenone type material, a benzotriazole type material, a substituted acrylonitrile type material, or a triazine type material, and the second absorbing material can provide a proper UV light filtering.

In conclusion, connecting layer of electrochromic mirror module of embodiment of the present disclosure includes first absorbing material. The first absorbing material can absorb light in the first spectrum, and wavelength of the first spectrum falls in the range from 570 nm to 720 nm, part of the incident light can be filtered after entering the electrochromic mirror module. Since the first spectrum include red visible light spectrum, orange visible light spectrum, and yellow visible light spectrum, light received by the user from the electrochromic mirror module won't be yellowish. Therefore, the electrochromic mirror module of the embodiment of the present disclosure can provide reflection image with proper color.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrochromic mirror module, comprising:
   a cover lens;
   a connecting layer comprising an adhesive, a first absorbing material and a second absorbing material, wherein the adhesive is mixed with the first absorbing material and the second absorbing material, and the adhesive includes N-butyl acrylate monomer, acrylic acid monomer, AIBN initiator, 1, 3-bis(N, N-diglycidyl-aminomethyl) group, or tetraepoxycy clohexanol crosslinking agent; and
   an electrochromic device,
   wherein the connecting layer connects the cover lens to the electrochromic device, and the electrochromic device is configured to receive an incident light, and the incident light sequentially passes through the cover lens and the connecting layer and reaches the electrochromic device, and the first absorbing material is configured to absorb a light of the incident light which is in a first spectrum, and the second absorbing material is configured to absorb a light of the incident light which is in a second spectrum, and wavelength of the first spectrum falls in a range from 570 nm to 720 nm and wavelength of the second spectrum falls in a range from 300 nm to 400 nm.

2. The electrochromic mirror module of claim 1, wherein the first absorbing material includes a polymer, and the polymer includes a 1,3-diphenylisobenzofuran, a carotenoid, a poly-benzene, or a derivative thereof.

3. The electrochromic mirror module of claim 1, wherein the second absorbing material includes a salicylate material, a benzophenone material, a benzotriazole material, a substituted acrylonitrile material, or a triazine material.

4. The electrochromic mirror module of claim 1, wherein the electrochromic device comprises:
   a first light transmissive electrode;
   an electrochromic layer; and
   a second light transmissive electrode,
   wherein the electrochromic layer is disposed between the first light transmissive electrode and the second light transmissive electrode, and the incident light reaches the electrochromic layer through the first light transmissive electrode.

5. The electrochromic mirror module of claim 4, wherein the electrochromic device further comprising:
   a light transmissive substrate; and
   a reflective substrate,
   wherein the first light transmissive electrode is disposed on a surface of the light transmissive substrate facing the electrochromic layer, and the reflective substrate is corresponded to the light transmissive substrate, and the second light transmissive electrode is disposed on a surface of the reflective substrate facing the electrochromic layer.

6. The electrochromic mirror module of claim 4, wherein the electrochromic layer includes an organic material, and the organic material includes polymer of 3,4-Ethylenedioxythiophene monomer, V1logen monomer, or acrylic monomer.

7. The electrochromic mirror module of claim 1 further comprising a carrier substrate, wherein the electrochromic device, the connecting layer and the cover lens are sequentially disposed on the carrier substrate.

* * * * *